(12) United States Patent
Zabaneh

(10) Patent No.: US 10,210,544 B2
(45) Date of Patent: Feb. 19, 2019

(54) DISPLAYING MERCHANDISE WITH AVATARS

(71) Applicant: PayPal, Inc., San Jose, CA (US)

(72) Inventor: May Zabaneh, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 170 days.

(21) Appl. No.: 14/573,996

(22) Filed: Dec. 17, 2014

(65) Prior Publication Data

US 2016/0180391 A1 Jun. 23, 2016

(51) Int. Cl.
*G06Q 30/02* (2012.01)
*G06F 17/30* (2006.01)

(52) U.S. Cl.
CPC ... *G06Q 30/0261* (2013.01); *G06F 17/30867* (2013.01); *G06Q 30/0269* (2013.01); *G06Q 30/0276* (2013.01)

(58) Field of Classification Search
CPC ........... G06Q 30/0261; G06Q 30/0269; G06Q 30/0276; H04W 4/021
See application file for complete search history.

(56) References Cited

U.S. PATENT DOCUMENTS

| | | | |
|---|---|---|---|
| 9,841,939 B2 * | 12/2017 | Liu | G06F 3/1454 |
| 2001/0037209 A1 | 11/2001 | Tarbutton et al. | |
| 2003/0065578 A1 * | 4/2003 | Peyrelevade | A45D 44/005 |
| | | | 705/14.54 |
| 2006/0143569 A1 * | 6/2006 | Kinsella | G06Q 10/107 |
| | | | 715/752 |
| 2008/0004950 A1 | 1/2008 | Huang et al. | |
| 2008/0245863 A1 * | 10/2008 | Buchheit | G06Q 30/02 |
| | | | 235/383 |
| 2008/0249897 A1 * | 10/2008 | Oh | G06Q 30/02 |
| | | | 705/27.2 |
| 2009/0259539 A1 * | 10/2009 | Dawson | G06Q 30/02 |
| | | | 705/14.4 |
| 2011/0022965 A1 | 1/2011 | Lawrence et al. | |
| 2011/0047046 A1 | 2/2011 | Torres | |
| 2011/0078055 A1 * | 3/2011 | Faribault | G06Q 30/02 |
| | | | 705/27.2 |
| 2011/0298897 A1 * | 12/2011 | Sareen | G06N 3/006 |
| | | | 348/47 |
| 2011/0320293 A1 * | 12/2011 | Khan | G06Q 20/0457 |
| | | | 705/16 |
| 2012/0095805 A1 * | 4/2012 | Ghosh | G06Q 30/0201 |
| | | | 705/7.34 |

(Continued)

OTHER PUBLICATIONS

International Search Report for PCT Application No. PCT/US15/63285 issued by the US Searching Authority dated Feb. 3, 2016; pp. 1-2.

(Continued)

*Primary Examiner* — Dino Kujundzic
(74) *Attorney, Agent, or Firm* — Haynes and Boone, LLP

(57) ABSTRACT

A system and method comprises one or more processors coupled to a memory and reads instructions from the memory to perform the step of determining that a user is near the store, determining an object for recommending to the user from an inventory for the store, rendering a digital image of an avatar wearing the object, and instructing a device to display the digital image of the avatar wearing the object.

20 Claims, 10 Drawing Sheets

(56) References Cited

U.S. PATENT DOCUMENTS

| | | | |
|---|---|---|---|
| 2012/0158515 A1* | 6/2012 | K. | G06Q 30/0269 705/14.66 |
| 2012/0190386 A1* | 7/2012 | Anderson | G01C 15/04 455/456.3 |
| 2013/0030915 A1* | 1/2013 | Statler | G06Q 30/02 705/14.54 |
| 2013/0030953 A1* | 1/2013 | Marsic | G06Q 30/06 705/26.7 |
| 2013/0083065 A1* | 4/2013 | Schulze | G06T 19/006 345/633 |
| 2013/0215116 A1* | 8/2013 | Siddique | G06Q 30/0643 345/420 |
| 2013/0268353 A1* | 10/2013 | Zeto, III | G06Q 30/02 705/14.45 |
| 2013/0282438 A1* | 10/2013 | Hunter | G01S 1/02 705/7.32 |
| 2013/0290106 A1* | 10/2013 | Bradley | G06Q 90/20 705/14.64 |
| 2014/0006152 A1 | 1/2014 | Wissner-Gross et al. | |
| 2014/0040041 A1* | 2/2014 | Ohnemus | G06Q 30/0627 705/14.66 |
| 2014/0108208 A1 | 4/2014 | Piana | |
| 2014/0129343 A1* | 5/2014 | Finster | G06Q 30/0269 705/14.66 |
| 2014/0150117 A1* | 5/2014 | Yamahara | G06F 21/31 726/28 |
| 2014/0188670 A1* | 7/2014 | Ajala | G06Q 30/0643 705/27.2 |
| 2014/0249961 A1 | 9/2014 | Zagel et al. | |
| 2014/0337123 A1* | 11/2014 | Nuernberg | G06Q 30/0246 705/14.45 |
| 2014/0365304 A1* | 12/2014 | Showers | G06Q 30/02 705/14.55 |
| 2014/0368499 A1* | 12/2014 | Kaur | G06T 19/20 345/420 |
| 2015/0058239 A1* | 2/2015 | Lenahan | G06Q 30/0631 705/319 |
| 2015/0081474 A1* | 3/2015 | Kostka | G06Q 30/0633 705/26.8 |
| 2015/0134302 A1* | 5/2015 | Chhugani | G06T 19/20 703/1 |
| 2015/0176998 A1* | 6/2015 | Huang | H04W 4/021 701/400 |
| 2015/0262117 A1* | 9/2015 | Li | G06Q 10/087 235/385 |
| 2015/0348146 A1* | 12/2015 | Shanmugam | G06Q 30/0603 705/71 |
| 2015/0379623 A1* | 12/2015 | Gadre | G06Q 50/01 705/27.2 |
| 2016/0042402 A1* | 2/2016 | Gadre | G06Q 30/0269 705/14.66 |

OTHER PUBLICATIONS

Written Opinion of the International Searching Authority for PCT Application No. PCT/US15/63285 issued by the US Searching Authority dated Feb. 3, 2016; pp. 1-5.

* cited by examiner

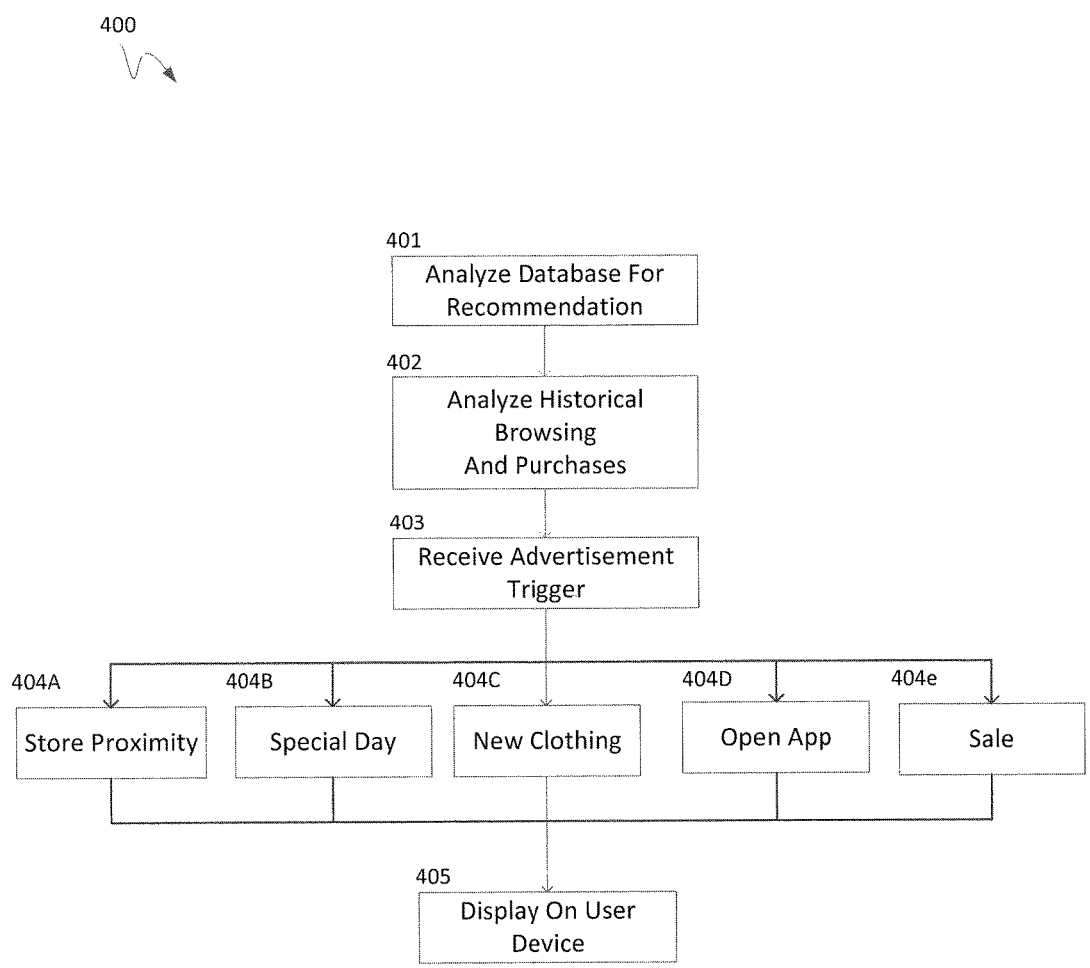

DISPLAYING MERCHANDISE WITH AVATARS

BACKGROUND

Field of the Disclosure

The present disclosure generally relates to digitally presenting merchandise, and more particularly to systems and methods for digitally presenting merchandise using avatars.

Related Art

With the advent of the internet, society has turned to purchasing merchandise online. Online purchasing is particularly attractive due to its convenience over a brick and mortar store. For example, people can purchase merchandise online with their smartphones wherever they have reception. Thus brick and mortar stores need a system for encouraging foot traffic in their stores. Traditional methods of enticing users into entering a store, such as window displays, are archaic. Thus a system and method that integrates modern technology with brick and mortar stores to increase foot traffic would be desirable.

Additionally, improvements can also be to the online purchasing process. There are still several drawbacks to purchasing merchandise online which hinders online sales. For example, it is difficult for a consumer to predict how wearable goods, such as clothing, may fit. Buying an incorrect size for clothing items online requires the cumbersome process of returning the item and ordering another size. Clothing sizes generally have some variations between brands, and users may find it difficult to predict how clothing may fit. Consumers may prefer to buy wearable goods in person, where the consumers are able to try on the clothing. Thus a system and method for aiding users in predicting clothing sizes would be desirable.

Another general problem consumers are faced with is purchasing wearable items as gifts for other people. For one, people don't generally know the clothing sizes of other people. This makes it difficult to buy an article of clothing, such as a shoe, as a gift for someone. Currently there are only gauche solutions to this problem, such as snooping, guessing, or buying a gift card. Snooping requires invading someone's privacy, guessing leads to buying incorrect sizes, and gift cards are impersonal. Furthermore, clothing choices are extremely personal and may attach to an individual's identity. Unless the clothing gift matches the style and taste of the recipient, the gift may be unwanted or unappreciated. Thus an elegant solution to this problem is desirable.

Purchasing a duplicate gift is also another awkward situation that often occurs. When purchasing gifts for someone, if it is an item the person highly desires, someone else or the intended recipient may have already purchased the item. This leads to a gift recipient receiving unnecessary duplicates of an item. Therefore, there is a need for a system and method for aiding individuals in purchasing wearable goods as gifts by recommending items with correct sizes which also match the style and taste of the intended recipient. It would also be beneficial if there was a system and method that would warn users when a duplicate item is about to be purchased, either because someone else has purchased the item as a gift or the intended recipient already owns the item.

The systems and methods disclosed herein provided solutions to the problems above in addition to other useful features.

BRIEF DESCRIPTION OF THE FIGURES

FIG. 4 is a flow diagram illustrating an exemplary process for recommending clothing.

Figure 1:
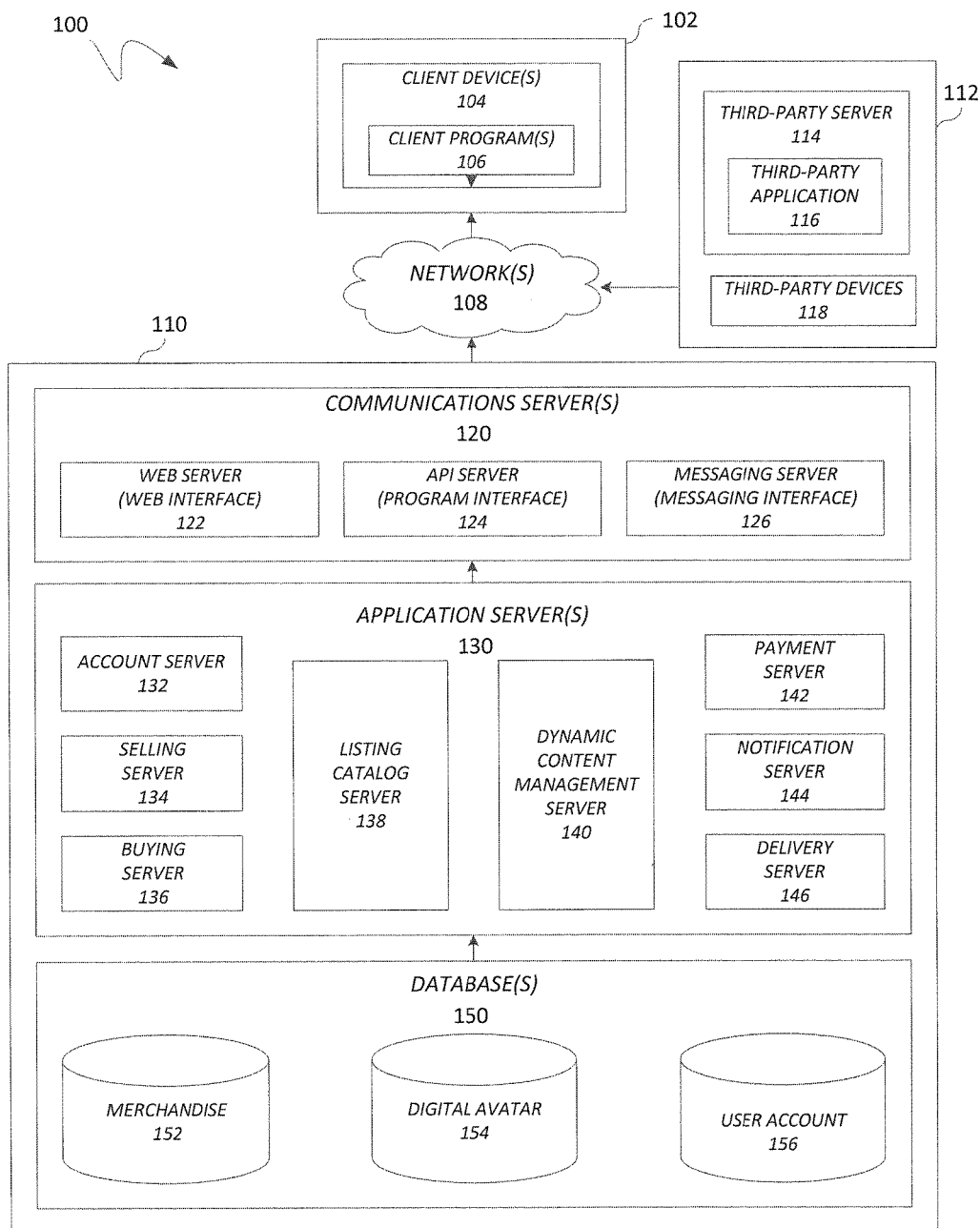
FIG. 1 is a block diagram of an exemplary computing system that is adapted for implementing a system for displaying merchandise with avatars.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

In some embodiments, a system and method are disclosed wherein a digital avatar is used to aid in consumer purchasing. In some embodiments, a system, such as a server or including a server, connected to a network, such as the internet, has a database of avatars. These avatars may be created based on information submitted by the users. The information submitted by a user may be attributes of the user. For example, the user may enter in information about their physical appearance, size, height, weight, hair color, skin pigmentation, and or the like. The user may enter in the information in data fields as part of a questionnaire displayed on graphical user interface (GUI). For example, the user may enter in 5 feet and 8 inches as their height. In some embodiments, user may submit the information by uploading one or more files to the system. The files be CAD files that may be created by three dimensional (3-D) scanners, body metric scanners, scales, photos, x-ray images, magnetic resonant imager (MRI), computerize cosmography (CT) scanner, and/or the like. Though in this example, a user used their own attributes for creating an avatar of a human, in some embodiments other attributes may be entered to create a digital avatar, for example, a user may make an avatar for an animal, such as a dog; another person, such as a friend; and/or something fictitious.

The system may use the information entered in by the user to create the digital avatar that may be viewed on a user device. The avatar may be a 2-D or 3-D animation or image that may be shown on a display and be interactive. The avatar may be shown to have realistic attributes. For example, an avatar of a user may be displayed as an accurate 3-D image and/or animation of the user with the user's real life attributes including, but not limited to, height, size, joints, pigmentation, looks, body proportion, weight, and/or the like. In some embodiments, the avatar may be created based on the attributes provided by the user, but use default and/or generic features for the face and hair of the avatar. There may be a set of generic features that a user may be able to choose from. In some embodiments, the generic features may be similar to that of a mannequin.

In some embodiments, the system may also accept information about other objects, such as wearable objects. Wearable objects include, but are not limited to, watches, clothing, dog collars, consumer goods, room sizes, beds, couches, shoes, makeup, eyewear, and/or anything else. The information about the objects may be user entered, or provided in a similar manner as the information for avatars (e.g. 3-D scans). Additionally, other information about the merchandise may be accepted by the system, which may be user provided. The information may include, sizing, the material makeup, physical attributes of the materials (e.g. stiffness, durability, stretch, flex), color, mechanical function (e.g. joints), and/or the like.

The system may create accurate and realistic digital representations of the objects. The digital representations may also be 3-D animations and/or images that maybe be shown on a display. Digital representation of objects may also be obtained from merchants, such as through a database, catalog, online site, etc. Such representations may be objects offered for purchase by the merchant at a brick and mortar store or through an online ordering system.

In some embodiments, the system may allow for objects and avatars to interact. For example, the system may display an avatar wearing clothing. The display of the avatar and the clothing may be scalar representations of the avatar and clothing. In some embodiments, the system may use the same scale for both the avatar and the clothing. In this manner, a user may be able to accurately predict how a clothing item may look and fit on the real life being the avatar is based off of.

In some embodiments, the system may provide users additional functionality to help learn more about an object in relation to an avatar. For example, the user may be able to turn the object, such as a shoe, partially transparent showing how the feet of the avatar fit inside the shoe. In this manner, a user may be able to determine what size of a shoe a user should buy for a person which the avatar is based off of.

Other functionality may include, but are not limited to, the ability to zoom in/out of an image and/or rotate the image over multiple plains. In some embodiments, the system may animate the avatar moving while wearing the digital object and animate how the object may move in real life.

In some embodiments, the system my provide services that revolve around the use of the avatar. For example, the system may track how a user uses their avatar and recommend merchandise based on the user activity. In some examples, the system may also use the attributes of the avatar when providing recommendations.

In some examples, the system may make sizing predictions. For example, an avatar of a user may be missing the sleeve size. The system may find users with similar and/or identical attributes that exist for the avatar, such as height, weight, waist, collar, and/or the like, and determine a likely sleeve size for the avatar based on the avatars of the other users.

In some examples, the system may make sizing predictions for an object for a user. The system may provide a fitting survey regarding clothing and how well the clothing fit. The survey may be provided to users that purchase the clothing and use the survey to adjust size recommendations for the user and/or other users for clothing.

In some examples, the system may recommend a sizing based on attributes of the clothing in relation to the attribute of the avatar. For example, the system may recommend 30 inch pants for an avatar with a 30 inch waist.

In some examples, the system may store and/or link a profile of the user to one or more avatars. The profile may include information about the user that is not related to the creation of the avatar. Information such as, purchase history, browsing history, return history, surveys completed by the user, demographic information, residence, income, socio-economic status, price range of most purchases, social network, birth days, wedding days, anniversaries and/or the like. In some embodiments, the system may work with third part systems, such as credit card companies, merchants, and the like for receiving data about a user to edit, create, and/or populate one or more profiles. In some embodiments, the profile information may be used to recommend products for the user. In some examples, the system may provide filters which allow a user to browse items based on certain categories, such as item type, whether the item was new, items the user has not viewed before, items the user does not own, and/or the like. In this manner, a user will not have to sift through unwanted objects.

In some examples, the system may allow users to share or make their avatars available for use, viewing, and/or the like. In some examples the users may share avatars with individuals within their social network. In this manner, the system may aid users in purchasing products for other individuals. For example, instead of asking about shoe sizes, a user with access to a person's avatar may be able to just have the avatar wear the shoes and see whether they fit. Furthermore, additional information may be provided, such as whether the person bought a product already or whether someone else bought the product as a gift for the person. In this manner, users may prevent purchasing a gift that a person already has. In some embodiments, the system may also allow users to view browsing history of an individual. In this manner, users may be able to determine which items a user may have been interested in or uninterested in. In some embodiments, the system may provide recommendations based on the purchase history of the person the avatar is based off of.

Additionally, in some embodiments, users may have privacy settings which allows for a user to limit the amount of information that other people may view about their avatar and/or profile. In some examples, a user may be able to classify social network connections and have each classification follow a different privacy setting. For example, there may be a privacy setting which allows and/or prevents other accounts to view purchases that the user has made.

In some examples a user may individually change privacy settings for each social network connection. In some embodiments, a user may have an option and/or pause setting which stops or prevents the system from collecting user information and/or data (e.g. browsing history) for a period of time. The setting or option may be a virtual on/off switch. In some embodiments, a user may also have the ability to view and/or delete some of the information collected about the user.

In some examples, the system may aid a user in purchasing objects. For example, the user may want to purchase an article of clothing that the user had its avatar wear. The system may recommend an online merchant for purchasing the product, and/or a brick and mortar store. In some embodiments, the system may determine a location related to the user and recommend a brick and mortar store based on the determined location.

Is some embodiments, a system for providing clothing information comprises one or more processors coupled to a memory reads instructions from the memory to perform the step of receiving measurements for a first user, rendering a digital avatar based on the received measurements for the first user, receiving measurements for an article of clothing, rendering a digital representation of the article of clothing based on the received measurement for the article of clothing, rendering an image of the digital avatar wearing the digital representation of the article of clothing, and sending the image of the avatar wearing the digital representation of the article of clothing to a user device of a second user.

In some embodiments, the system may detect that a user is near a merchant, retrieve and/or access the merchant inventory and determine merchandise that may be interesting to the user. The system may send a notification to the user through a user device indicating that there is merchandise that the user may be interested in. In some example, the notifications may occur as the user passes near the merchandise. In some examples, the notifications may be provided as the use is near the merchant store. In some embodiments, the system may entice the user to enter and purchase the product from the store by displaying the merchandise being worn by the avatar and/or providing other incentives such as rewards points and/or discounts. The system may allow the user to purchase products in the store from the user device. The user may choose to locate the item and/or have it shipped to him at a later time. In some embodiments, the system may also aid the user in tracking down the merchandise that the user is interested in and/or purchased. The system may also reserve the purchased item for the user to pick up, possibly at a later time.

In some embodiments, a computer implemented method of providing clothing information is provided, the method comprises receiving measurements for a user, rendering a digital avatar based on the received measurements for the user, receiving measurements for an article of clothing, rendering a digital representation of the article of clothing based on the received measurement for the article of clothing, rendering an image of the digital avatar wearing the digital representation of the article of clothing, and displaying the image of the avatar wearing the digital representation of the article of clothing on a user device.

In some embodiments, a system comprises a processor configured to receive measurements for a first user, render a digital avatar based on the received measurements for the first user, receive measurements for an article of clothing, render a digital representation of the article of clothing based on the received measurement for the article of clothing, render an image of the digital avatar wearing the digital representation of the article of clothing, and send the image of the avatar wearing the digital representation of the article of clothing to a user device.

FIG. 1 illustrates, in block diagram format, an exemplary embodiment of a computing system adapted for implementing a system and method for displaying merchandise using a digital avatar. As shown, a computing system 100 may comprise or implement a plurality of servers and/or software components that operate to perform various methodologies in accordance with the described embodiments. Exemplary servers may include, for example, stand-alone and enterprise-class servers operating a server operating system (OS) such as a MICROSOFT® OS, a UNIX® OS, a LINUX® OS, or other suitable server-based OS. It may be appreciated that the servers illustrated in FIG. 1 may be deployed in other ways and that the operations performed and/or the services provided by such servers may be combined, distributed, and/or separated for a given implementation and may be performed by a greater number or fewer number of servers. One or more servers may be operated and/or maintained by the same or different entities.

Computing system 100 may include, among various devices, servers, databases and other elements, one or more clients 102 that may comprise or employ one or more client devices 104, such as a laptop, a mobile computing device, a tablet, a PC, a wearable device, and/or any other computing device having computing and/or communications capabilities in accordance with the described embodiments. Client devices 104 may include a cellular telephone, smart phone, or other similar mobile devices that a user may carry on or about his or her person and access readily.

Client devices 104 generally may provide one or more client programs 106, such as system programs and application programs to perform various computing and/or communications operations. Exemplary system programs may include, without limitation, an operating system (e.g., MICROSOFT® OS, UNIX® OS, LINUX® OS, Symbian OS™, Embedix OS, Binary Run-time Environment for Wireless (BREW) OS, JavaOS, a Wireless Application Protocol (WAP) OS, and others), device drivers, programming tools, utility programs, software libraries, application programming interfaces (APIs), and so forth. Exemplary application programs may include, without limitation, a web browser application, messaging applications (e.g., e-mail, IM, SMS, MMS, telephone, voicemail, VoIP, video messaging), contacts application, calendar application, electronic document application, database application, media application (e.g., music, video, television), location-based services (LBS) applications (e.g., GPS, mapping, directions, positioning systems, geolocation, point-of-interest, locator) that may utilize hardware components such as an antenna, and so forth. One or more of client programs 106 may display various graphical user interfaces (GUIs) to present information to and/or receive information from one or more users of client devices 104. In some embodiments, client programs 106 may include one or more applications configured to conduct some or all of the functionalities and/or processes discussed below.

As shown, client devices 104 may be communicatively coupled via one or more networks 108 to a network-based system 110. Network-based system 110 may be structured, arranged, and/or configured to allow client 102 to establish one or more communications sessions between network-based system 110 and various computing devices 104 and/or client programs 106. Accordingly, a communications session between client devices 104 and network-based system 110 may involve the unidirectional and/or bidirectional exchange of information and may occur over one or more types of networks 108 depending on the mode of communication. While the embodiment of FIG. 1 illustrates a computing system 100 deployed in a client-server operating environment, it is to be understood that other suitable operating environments and/or architectures may be used in accordance with the described embodiments.

Data and/or audio communications between client devices 104 and the network-based system 110 may be sent and received over one or more networks 108 such as the Internet, a WAN, a WWAN, a WLAN, a mobile telephone network, a landline telephone network, as well as other suitable networks. For example, client devices 104 may communicate with network-based system 110 over the Internet or other suitable WAN by sending and or receiving information via interaction with a web site, e-mail, IM session, and/or video messaging session. Any of a wide variety of suitable communication types between client devices 104 and system 110 may take place, as will be readily appreciated. In particular, wireless communications of any suitable form may take place between client device 104 and system 110, such as that which often occurs in the case of mobile phones or other personal and/or mobile devices.

In various embodiments, computing system 100 may include, among other elements, a third party 112, which may comprise or employ a third-party server 114 hosting a third-party application 116 and third-party devices 118. In various implementations, third-party server 114 and/or third-party application 116 may host applications associated with or employed by a third party 112. For example, third-party server 114 and/or third-party application 116 may enable network-based system 110 to provide client 102 with additional services and/or information, such as inventory, inventory measurements (e.g. sizes, color, material, etc.), inventory availability, location services, sales, advertisements, maps and/or other services and information, some of which will be discussed in greater detail below. Third-party server 114 and/or third-party application 116 may also provide system 110 and/or client 102 with other information and/or services, such as email services and/or information, social networking services and/or information, travel services and/or information, purchase services and/or information, and/or other online services and/or information. Third-party server 114 and/or third-party application 116 may work with third-party devices 118 to provide some of the third-party services. For example, third-party devices may be may be wireless communication devices such as Bluetooth® beacons, wireless switches and/or routers, RF transmitters, IR transmitters, and/or the like. In some examples third-party devices 118 may be used to locate and/or determine the location of a user 102 by locating one or more of client devices 104. For example, third-party devices 118 may be wireless beacons using Bluetooth® Low Energy that can connect, communicate, and triangulate the location of one or more user devices 102 when within communication proximity. In some embodiments, third-party devices 118 may include locator tags and wireless beacons for locating the locator tags. For example, a third-party, such as a merchant, may attach locator tags on merchandise to help locate and track merchandise movement. In some embodiments, third-party devices 118 may include large displaying devices and/or monitors that may be used for displaying advertisements in malls and/or stores.

In one embodiment, third-party server 114 may include a social networking server that hosts a user's social network account. In another embodiment, third party-server 114 may include an email server that hosts a user's email account. In yet another embodiment, third-party sever 114 may include one or more servers for aggregating user data and statistics.

Network-based system 110 may comprise one or more communications servers 120 to provide suitable interfaces that enable communication using various modes of communication and/or via one or more networks 108. Communications servers 120 may include a web server 122, an API server 124, and/or a messaging server 126 to provide interfaces to one or more application servers 130. Application servers 130 of network-based system 110 may be structured, arranged, and/or configured to provide various online services, account authentication, social networking, account management, merchandise recommendations, product discount notifications, product locating, product purchasing and other services to users that access network-based system 110. In various embodiments, client 102 may communicate with applications servers 130 of network-based system 110 using one or more client devices 104 via one or more of a web interface provided by web server 122, a programmatic interface provided by API server 124, and/or a messaging interface provided by messaging server 126. It may be appreciated that web server 122, API server 124, and messaging server 126 may be structured, arranged, and/or configured to communicate with various types of client devices 104 and/or client programs 106 and may interoperate with each other in some implementations.

Web server 122 may be arranged to communicate with web clients and/or applications such as a web browser, web browser toolbar, desktop widget, mobile widget, web-based application, web-based interpreter, virtual machine, and so forth. API server 124 may be arranged to communicate with various client programs 106 and/or a third-party application 116 comprising an implementation of API for network-based system 110. Messaging server 126 may be arranged to communicate with various messaging clients and/or applications such as e-mail, IM, SMS, MMS, telephone, VoIP, video messaging, and so forth, and messaging server 126 may provide a messaging interface to enable access by client 102 and/or third party 112 to the various services and functions provided by application servers 130.

When configured to implement a system and method for display merchandise using a digital avatar, application servers 130 of network-based system 110 may be a server that provides various product browsing, product discounting, product notification, product research, and social connection services. Application server 130 of network-based system 110 may provide services such as, account services, listing catalog services, dynamic content management services, payment services, user data gathering services, return services, product demonstration services, buying services, delivery services, location services, notification services, fund transfer, funds and/or currency exchanges and/or other services. Application servers 130 may include an account server 132, a listing catalog server 138, a dynamic content management server 140, a payment server 142, a notification server 144, and/or a delivery server 146. Application servers 130 may further include a selling server 134, a buying server 136, a payment server 142, and/or a delivery server 146. These servers, which may be in addition to other servers, may be structured and arranged to aid in purchasing and displaying products through the use of a virtual avatar in addition to some or all of the other services as discussed above and in more detail below.

Application servers 130, in turn, may be coupled to and capable of accessing one or more databases 150 including a merchandise database 152, a digital avatar database 154, and/or user account database 156. Databases 150 generally may store and maintain various types of information for use by application servers 130 and may comprise or be implemented by various types of computer storage devices (e.g., servers, memory) and/or database structures (e.g., relational, object-oriented, hierarchical, dimensional, network) in accordance with the described embodiments.

Figure 2:
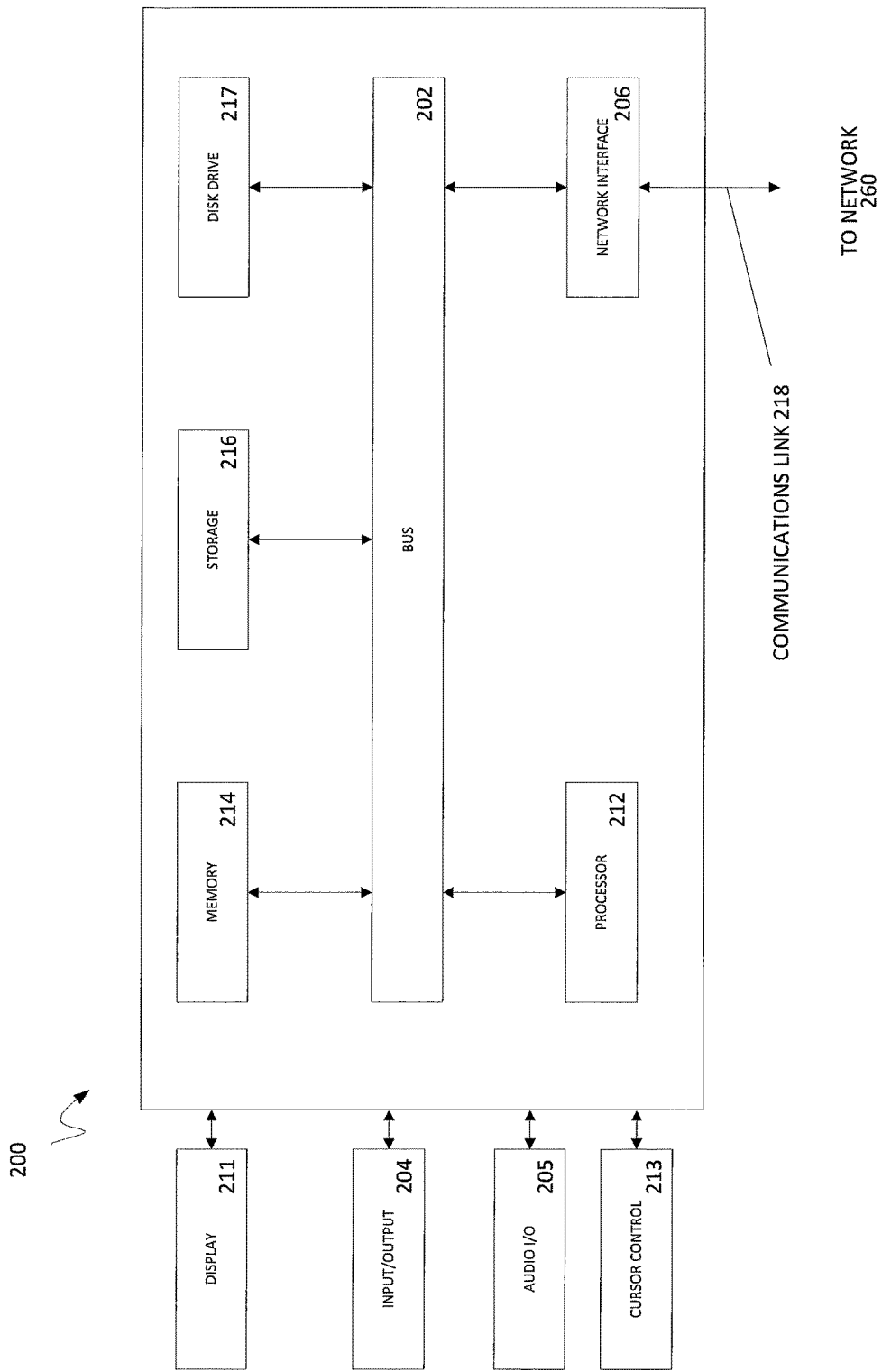
FIG. 2 is a block diagram of an exemplary computer system suitable for implementing one or more devices of the computing system in FIG. 1.

FIG. 2 illustrates an exemplary computer system 200 in block diagram format suitable for implementing on one or more devices of the computing system in FIG. 1. In various implementations, a device that includes computer system 200 may comprise a personal computing device (e.g., a smart or mobile phone, a computing tablet, a personal computer, laptop, wearable device, PDA, Bluetooth device, key FOB, badge, etc.) that is capable of communicating with a network. A service provider and/or a payment provider may utilize a network computing device (e.g., a network server) capable of communicating with the network. It should be appreciated that each of the devices utilized by users, service providers, and payment providers may be implemented as computer system 200 in a manner as follows.

Additionally, as more and more devices become communication capable, such as sensors using wireless communication to report, track, message, relay information and so forth, these devices may be part of such transactions. For example, a user may have clothing with sensors that can conduct body scans to determine a user's height, weight, body make up, and other measurements. This information may be transmitted through a network connection to the system described herein and/or relayed through a user device.

Computer system 200 may include a bus 202 or other communication mechanisms for communicating information data, signals, and information between various components of computer system 200. Components include an input/output (I/O) component 204 that processes a user action, such as selecting keys from a keypad/keyboard, selecting one or more buttons, links, actuatable elements, etc., and sends a corresponding signal to bus 202. I/O component 204 may also include an output component, such as a display 211 and a cursor control 213 (such as a keyboard, keypad, mouse, touch screen, etc.). An optional audio input/output component 205 may also be included to allow a user to use voice for inputting information by converting audio signals. Audio I/O component 205 may allow the user to hear audio. A transceiver or network interface 206 transmits and receives signals between computer system 200 and other devices, such as another user device, a merchant server, an email server, application service provider, web server, a social networking server, a payment provider server, and/or other servers via a network. In various embodiments, such as for many cellular telephone and other mobile device embodiments, this transmission may be wireless, although other transmission mediums and methods may also be suitable. A processor 212, which may be a micro-controller, digital signal processor (DSP), or other processing component, processes these various signals, such as for display on computer system 200 or transmission to other devices over a network 260 via a communication link 218. Again, communication link 218 may be a wireless communication in some embodiments. Processor 212 may also control transmission of information, such as cookies, IP addresses, and/or the like to other devices.

Components of computer system 200 also include a system memory component 214 (e.g., RAM), a static storage component 216 (e.g., ROM), and/or a disk drive 217. Computer system 200 performs specific operations by processor 212 and other components by executing one or more sequences of instructions contained in system memory component 214. Logic may be encoded in a computer readable medium, which may refer to any medium that participates in providing instructions to processor 212 for execution. Such a medium may take many forms, including but not limited to, non-volatile media, volatile media, and/or transmission media. In various implementations, non-volatile media includes optical or magnetic disks, volatile media includes dynamic memory, such as system memory component 214, and transmission media includes coaxial cables, copper wire, and fiber optics, including wires that comprise bus 202. In one embodiment, the logic is encoded in a non-transitory machine-readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 200. In various other embodiments of the present disclosure, a plurality of computer systems 200 coupled by communication link 218 to the network (e.g., such as a LAN, WLAN, PTSN, and/or various other wired or wireless networks, including telecommunications, mobile, and cellular phone networks) may perform instruction sequences to practice the present disclosure in coordination with one another. Modules described herein may be embodied in one or more computer readable media or be in communication with one or more processors to execute or process the steps described herein.

A computer system may transmit and receive messages, data, information and instructions, including one or more programs (i.e., application code) through a communication link and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable media. It is also contemplated that software identified herein may be implemented using one or more computers and/or computer systems, networked and/or otherwise. Such software may be stored and/or used at one or more locations along or throughout the system, at client 102, network-based system 110, or both. Where applicable, the ordering of various steps described herein may be changed, combined into composite steps, and/or separated into sub-steps to provide features described herein.

The foregoing networks, systems, devices, and numerous variations thereof may be used to implement one or more services, such as the services discussed above and in more detail below.

Figure 3:
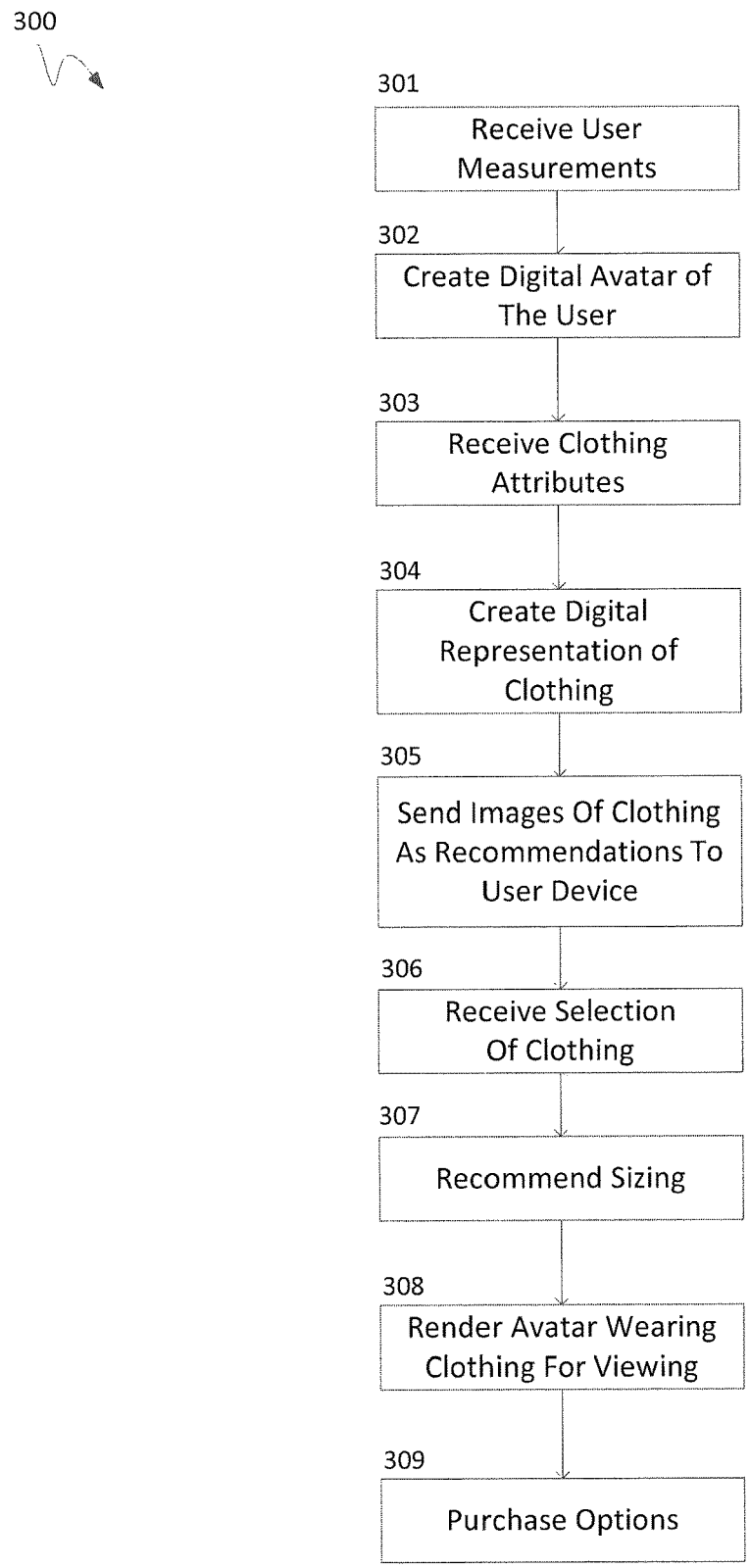
FIG. 3 is a flow diagram illustrating an exemplary process for implementing a clothing purchase assistant.

FIG. 3 is a flow diagram illustrating a process 300 for implementing a clothing purchase assistant that may be a part of a system and method for displaying merchandise using a digital avatar. Process 300 may be implemented on a system such as system 100 of FIG. 1 according to some embodiments. Though the embodiments discussed below are in relation to clothing, the process may also be applied to any wearable merchandise, such as jewelry. Furthermore, in some embodiments, the process may also be applied to any other merchandise, such as sporting goods, furniture, toys, kitchenware and/or the like. At 301 the system may receive measurements for creating an avatar. These measurements may be the measurements of a user, individual, animal, and/or fictitious individual or animal. The measurements may include sizes for hat/head, shoe/feet, height, waist, inseam, outseam, cuff, hip, thigh, front/back rise, chest, bust, cup, sleeve, stomach, sleeve width, neck, shoulder, torso, and/or the like. In some embodiments, the system may receive a 3-D scan of a person and/or animal from a 3-D scanner as avatar measurements. The 3-D scan may come in the form of a data file. In some embodiments the avatar measurements may be measurement values entered by a user into a client device such as one of the client devices 104 of FIG. 1. The user may manually enter in the measurement values or upload a file with the measurements such as a file from a 3-D scanner. The files may be uploaded from a user and/or merchant device.

The user may also enter in other attributes, such as skin, hair, nail and eye color. These attributes may be manually entered into a data field and/or provided through a digital photograph.

At 302, the system may create a 3-D digital avatar based on the attributes received at 301. In some embodiments, the avatar may be a digital doppelganger of a person. The avatar may be created using a computer aided design (CAD) engine, such as 3DS Max™ Maya™, and/or other CAD engines.

In some embodiments, the system may predict certain attributes or measurements of the avatar that may be missing and/or needed to create the 3-D digital avatar. For example, a user may have omitted their waist size. In some embodiments, the system may use an average measurement for the missing attribute(s). In some embodiments, the system may predict certain attributes by identifying other avatars which match the provided attributes, and using the average of the missing measurement from the matching avatars. In some embodiments the system may use measurements from avatars based on 3-D body scans to predict measurements of another avatar with manually entered clothing sizes to increase the accuracy of the avatar.

In some embodiments, a user may be able to share the 3-D digital avatar with other users, such as individuals that are part of the user's social network. In this manner, users may use other people's avatars to help purchase gifts. Users may be able to see the measurements of the avatar and may be able to view what items other users have bought, browsed, and/or are recommended by the system. The user may be able to use avatars from other users for modeling clothes, view fitting, and/or the like. In this manner, the system may aid the user in finding clothes that fit the other user. In some embodiments, the system may store the 3-D digital avatar and the information used to create the digital avatar (e.g. received attributes, 3-D scan, etc.) in a database, such as database 154 of FIG. 1, and link and/or associate the avatar to one or more user accounts.

At 303, the system may receive attributes for merchandise, such as clothing. The attributes may be measurements (e.g. medium, large, small, waist size, etc.), fabric type(s) (e.g. wool, silk, cotton, etc.), thickness, type of clothing (e.g. hat, pants, shirt, blouse, sweater, dress, tie, etc.), colors, and/or the like. In some embodiments, the system may receive 3-D scans of the clothing. In some embodiments, the attributes for clothing may be related to clothing manufactured by a clothing manufacturer and/or for sale by one or more merchants. In some embodiments, the clothing attributes may be provided by a merchant.

At 304, the system may create a digital representation of the clothing much in the same way as how an avatar is created. The system may create a 3-D digital representation of the clothing based on the attributes received at 303. The digital representation may be created using a computer aided design (CAD) engine, such as 3DS Max™, Maya™, and/or other CAD engines. The system may also use the attributes to predict how the clothing may flow and/or move when put in different environments, such as the clothing being worn by a 3-D avatar while the 3-D avatar is walking, how the clothing moves when blown by wind, and/or the like.

At 305, the system may send images of one or more articles of clothing to a user device for display by an application as a recommendation. The display may be part of a user interface which allows the user to interact with the avatar and clothing. The application may display the clothing as part of an advertisement. The advertisement of the clothing may be displayed as if it were being worn by an avatar, such as an avatar created by the user with the clothing size being a recommended size based on the attributes of the avatar. In some embodiments the avatar used to display the clothing may be an avatar of a paid model, using attributes of the model. In some embodiments, the merchant may be able to choose the used to display clothing for sale, such as a model which the merchant believes is particularly flattering when wearing the advertised clothing. In some embodiments the clothing may be advertised on an avatar related to someone in a user's social network. The advertisement may be recommending a gift for someone in the user's social network, such as a significant other. The gift recommendations/advertisements may occur during or close to certain days of significance, such as a birthday, Valentine's day, Christmas, Mother's Day, Father's Day and/or the like. For example, the system may notify a user, through their user device, that someone's birthday is coming within a week and display an avatar related to that someone wearing recommended gifts.

In some embodiments, the system may recommend and/or select certain articles of clothing based on the clothing purchase and/or browsing history of the user and/or an account of someone in the user's social network. In some embodiments, the system may take into account other statistics such as demographic, location, date, time, proximity to a physical store, and/or the like. For example, the system may recommend female clothing to a female, summer clothing in the summer, beachwear for someone near a beach, clothing from a department/merchant store nearby, and/or the like. The system may determine this information by collecting data from a user, either entered by the user, and/or based on user actions. Some of the information may come from third party data miners. In some embodiments, some of this information may be determined using locating services and/or applications on a user device (e.g. GPS and mapping applications).

At 306, the system may receive a selection of a wearable item from the user. In some embodiments, a user may perform a selection by tapping on a touch screen display. The tap may be on an image of an article of clothing displayed on the touch screen display. In some embodiments, a user may select an item using a cursor and I/O device to click on an image of the item. Other methods of selecting a virtual item will be recognized by one of ordinary skill in the art, all of which are contemplated herein.

At 307, the system may recommend a clothing size to the user. The clothing size recommendation may be based on the user's past purchase history, user measurements, clothing measurements, reviews from other users, reviews from others users with similar clothing measurements as the user, and/or the like. For example, the system may collect surveys from users that purchase wearable items, such as clothing, shoes, watches, and/or the like. The surveys may provide questioners requesting predetermined selectable answers such as, too big, too small, tight, loose, perfect fit and/or the like. The surveys may be sent to a user after a product is purchased, received, and/or returned. The surveys may be sent by the system to the user device through an application on the user device, email, SMS, and/or the like. The survey responses may be stored in a database in relation to the account and/or avatar, such as user account database 154 and/or 156 of FIG. 1.

At 308, the system may render a 3-D image and/or animation of the digital avatar of the user wearing the digital representation of the clothing. The image and animation may be sent to the user device for viewing and manipulation by the user. In some embodiments, the 3-D image displayed on the user device may be scaled to fit the screen size of the user device. The scale used for the avatar and the digital representation of the clothing may be the same. In this manner, a user may be able to obtain a relatively accurate representation of how the selected item, such as clothing, with a particular sizing would fit on a user with the attributes used to create the avatar. The system may render a 3-D animation for displaying the avatar in motion while wearing the item. The system may render realistic movement of the item based on the item attributes. In some embodiments the system may use an animation software engine, such as the ones used in 3DS Max™, Maya™, and/or other CAD and/or animation software to create the 3-D animations and/or images. The CAD software may allow for changing the animation mechanics and physics of an item based on certain variables, such as stiffness. The system may enter a certain level of stiffness to an item based on the material. For example, leather may have a higher stiffness value than silk. The CAD software may then simulate leather objects as less malleable than silk.

At 309, the system may provide the user with purchase options for the selected item. The system may provide the option through communications with an application on a user device. In some examples, the system may recommend an online store and/or a brick and mortar store for purchasing the item. In some embodiments, the system may recommend a brick and mortar store for purchasing the clothing based on the user's current and/or past location, residence, work place, and/or other places include places that the user frequently visits. The system may determine the location of a user through a combination of location and/or mapping software applications and associated hardware on a user device such as one of the client devices 104.

In some embodiments, when a user makes a purchase, the system may record the purchase in a database linked with the user and/or related avatar. In some examples, the system may provide the user the ability to indicate which avatar, user, and/or account the purchase was for and/or related to. For example, the user may indicate that the article of clothing bought was a gift for someone in their social network. The indication may be made by using an actuatable element provided by a graphical user interface on a user device. In some embodiments, the system may automatically determine which user, account, and/or avatar the purchase is related to by the avatar selection made by the user.

FIG. 4 is a flow diagram illustrating a process 400 for recommending and/or advertising clothing that might be a part of a system and method for displaying merchandise using a digital avatar. Process 400 may be used at 305 of process 300 in FIG. 3 to send images, animations, and/or 3-D digital renderings of items, such as clothing, as recommendations.

At 401, a system, such as the network-based system 110 of FIG. 1, may retrieve information related to a user account and user account information from a database, such as database 154 and 156 of FIG. 1. The information may include avatar attributes, user entered account information, product purchasing history, surveys and/or the like. The information may also include data about the user received from 3rd party data mining services. In some embodiments, the system may run a clustering algorithm on the database using the information related to the user. For example, the system may form a cluster by finding all user accounts with avatars with the same height, sex, age, and weight. In some examples the cluster may also use demographic information, residence, income, socio-economic status, social network, hobbies and/or the like as data points for clustering.

The system may then identify brands, articles of clothing, and/or the like that are popular in that cluster. Popularity may be determined by counting the number of occurrences a particular brand, article of clothing, and/or the like is viewed and/or purchased by the cluster. The clustering algorithm may be applied again on the cluster to narrow down recommendations. For example, the system may determine that a user has an affinity to a certain color, brand, price range, and/or the like. The affinity may be determined by counting the number of purchases a user has conducted related to a color, brand, price range and/or the like. The system may form a sub-cluster by applying the clustering algorithm on the original cluster. From the sub-cluster, the system may identify several brands, articles of clothing, and/or the like to recommend to the user based on the popularity of the brands, articles of clothing, and/or the like of the sub-cluster.

At 402, the system may analyze the browsing and purchase history of the user to see if the user recently browsed and/or purchased from a brand and/or an article of clothing identified at 401. The browsing history may be collected from an application on a user device that tracks the activity on the application and stored in a database in relation to the account. In some embodiments the system may find users with similar and/or identical attributes that exist for the avatar, such as height, weight, waist, collar, and/or the like, and determine a likely sleeve size for the avatar based on the avatars of the other users.

The system may then remove that brand and/or article of clothing from being recommended to the user. In some embodiments, the system may analyze whether someone in the social network of the user purchased an item for the user as a gift and remove that item from being recommended.

At 403, the system may receive a trigger for sending an advertisement to a user device. The trigger may be based on the store proximity to the user, whether a special day is coming up, a clothing update from a brand, the opening of an app on the user device, a product sale, and/or the like. Depending on the trigger, the system may present different advertisements.

At 404A, the system may receive an indication that the user is close to a brick and mortar store of a merchant that sells recommended items determined at 402. The indication may be sent from a user device, such as client device 104 of FIG. 1 and/or relayed by a third-party merchant device, such as a third-party server 114 of FIG. 1. The system may retrieve an inventory list and/or check an inventory list provided by the merchant for items that match the recommended items determined at 402. In some embodiments, the system may also check to see if the merchant had the recommended item in a recommended size for the user based on the attributes of an avatar. The matching items in the inventory list for the merchant may then be sent to be displayed on the user device at 405. In some embodiments, new items for sale may be displayed. For example, a user may frequently pass by a certain brick and mortar store, and the user may only be interested in seeing what is new. In some embodiments, the system may display new merchandise that was received since the user last passed by the store.

At 404B, the system may receive an indication from a user device and/or determine that a special day, holiday, and/or a day of significance is coming up (such as, within a few days and/or a week) for the user. Days of significance may include, but are not limited to, a wedding anniversary; birthday, baby shower and/or the like. These dates of significance may be provided by the user, or may be part of another application, such as a calendar application, that the system and/or user device has access to. The system may then send advertisements for recommended products to devices of people within the social network of the user that are related to the dates of significance, such as close friends, significant others, family members, and or the like. The system may retrieve some of this information from a social media applicant and/or from manual data entries from the user.

At 404C, the system may receive an indication of new clothing arriving or being sold by a merchant. This may be a season update and/or a new release. The system may send advertisements of the new clothing to the user device of a user the system determines may be interested in the items. The system may determine which users may be interested in a similar manner as how recommendations are made. In some embodiments, the system may determine that a user is interested in an item based on product purchase history and/or browsing history. For example, the system may send the advertisements to user devices of users who have made purchases in the past with the merchant.

At 404D, the system may receive an indication that an application, such as an application for browsing products in the system, is opened from a user device. In response, the system may send recommended items to the user device upon this indication. Such indication may be received through a network connection, such as network connection 108 of FIG. 1. The indication may trigger the system to send an advertisement to the user device, and/or trigger an application on the user device to display the advertisements.

At 404E, the system may receive an indication from a merchant that an item is on sale. This item may be a previously recommended item, recently browsed item, item from a preferred brand, and/or item for a recommended brand for a user. In some embodiments, the sale or discount may be provided to users who are part of a merchant's member loyalty program. The system may then send advertisements for the discounted item to the user device(s) of users where the item was previously recommended, recently browsed, of a preferred brand, and/or of a recommended brand.

At 405, the advertisements may be displayed on the user device through an application. The items may be shown with an avatar wearing the advertised item. The avatar may be of the user, or an avatar of someone within the social network of the user. The application may provide a user interface for the user to interact, view, locate and/or purchase the item.

In some embodiments, a map of local retailers carrying the advertised item may be displayed. The map may provide the user directions to the local retailer carrying the item. In some embodiments, the map may display the location of the item within a meter of its location and direct a user to the item within the merchant shop. In some embodiments the location of the item may be maintained by a merchant server, such as third party server 112 of FIG. 1, which the system may have access to.

Figure 5A:
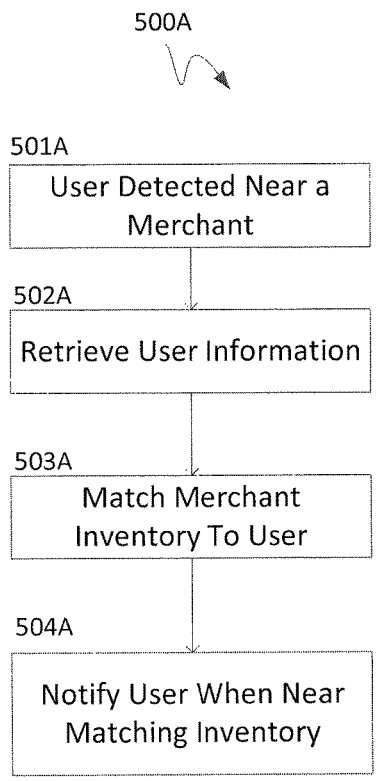
FIG. 5A is a flow diagram illustrating an exemplary process for enticing users to purchase merchandise from a store by displaying avatars with the merchandise when the user walks near the merchandise.
Figure 5B:
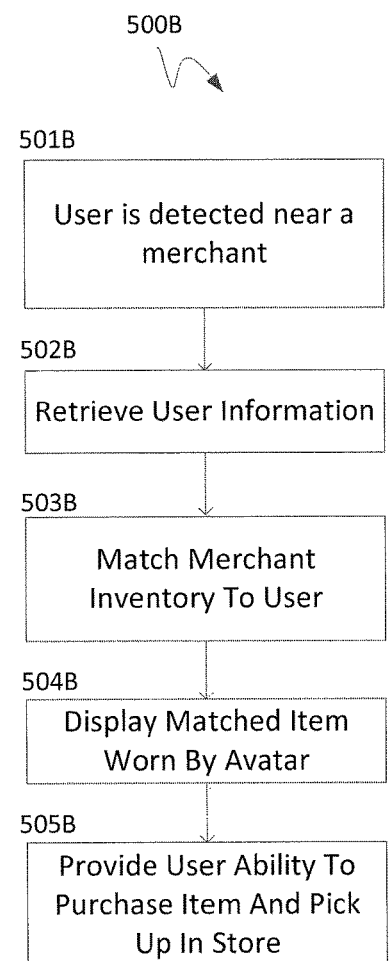
FIG. 5B is a flow diagram illustrating an exemplary process for enticing users to enter a brick and mortar store by displaying avatars with merchandise when the user is near the store.

FIGS. 5A and 5B are flow diagrams illustrating exemplary processes 500A and 500B for enticing users to purchase merchandise from a brick and mortar store by displaying merchandise on an avatar, according to some embodiments. Process 500A and 500B may be implemented on a system such as system 100 of FIG. 1, according to some embodiments.

Referring to FIG. 5A, at 501A a system may detect a user is nearby. This may be through one or more wireless beacons such as the exemplary wireless beacons that may be included as part of third-party devices 118 of FIG. 1. The one or more wireless beacons may detect a user is nearby when a user device comes within communication range of a wireless beacon. Some of the wireless beacons may be situated in front of a merchant store to detect users within walking distance of the store. In some embodiments, with wireless communication range of the beacons may be of approximately 100 meters.

At 502A, the system may retrieve user information. User information may include some or all of the information that is collected from the user in process 300 and/or process 400 of FIGS. 3 and 4 respectively. The user information may be retrieved from a user device of the user, and/or from one or more databases, such as the databases that make up databases 150 of FIG. 1. User information may include, but is not limited to, purchase history, merchandise browsing history, avatar attributes, and/or the like. The user information may be linked to an identifier that may be retrieved from the user device, such as an account name and/or an account identifier.

At 503A the system may match merchant inventory to the user. In some embodiments, the system may match inventory to the user based on sex, size, and/or purchase history. In some embodiments, the system may match the inventory similar to how recommendations are made in FIG. 4, such as process 401 and 402.

At 504A the system may notify a user of recommended items nearby as a user walks through the store. In some embodiments, the system may instruct a user device of the user to display an avatar of the user wearing the items matched at 503A. The user device may be on or more of the user devices discussed in FIG. 1, such as one of client devices 104. In some embodiments merchandise that the user may be interested in may be displayed as the user walks near the merchandise. For example, a merchant device, such as a wireless beacon, may track the location of the user (e.g. by locating a client device on the user) and the location of merchandise (e.g. through locator tags). When the system determines through the merchant device that a client device is close to the merchandise that is relevant to the user (e.g. recommended clothing based on analysis of user information and/or avatar attributes) the system may instruct the client device to display an avatar of the user wearing the merchandise. The system may also instruct the client device to notify the user of the displayed avatar. The notification may be a vibration, sound, and/or a flash. In some embodiments, merchandise may also have QR codes, barcodes, and/or the like attached to the merchandise. A user may user a client device to scan in the QR code and retrieve digital representations of merchandise from the system and/or merchant server for display on the user device. In some examples the merchandise may be displayed being worn by a digital avatar. In some embodiments, when displaying merchandise on a user device, the server may also provide incentives to purchase the product, such as discounts and/or rewards points.

Referring now to exemplary process 500B of FIG. 5B that may be implemented, at 501B a system may detect a user is nearby. This may be through one or more wireless beacons such as the exemplary wireless beacons that may be included as part of third-party devices 118 of FIG. 1. The one or more wireless beacons may detect a use is nearby when a user device comes within communication range of a wireless beacon. Some of the wireless beacons may be situated in front of a merchant store to detect users within walking distance of the store. In some embodiments, with wireless communication range of the beacons may be of approximately 100 meters.

At 502B, the system may retrieve user information. User information may include some or all of the information that is collected from the user in process 300 and/or process 400 of FIGS. 3 and 4 respectively. The user information may be retrieved from a user device of the user, and/or from one or more databases, such as the databases that make up databases 150 of FIG. 1. User information may include, but is not limited to, purchase history, merchandise browsing history, avatar attributes, and/or the like. The user information may be linked to an identifier that may be retrieved from the user device, such as an account name and/or an account identifier.

At 503B the system may match merchant inventory to the user. In some embodiments, the system may match inventory to the user based on sex, size, and/or purchase history. In some embodiments, the system may match the inventory similar to how recommendations are create in FIG. 4, such as process 401 and 402.

At 504B the system may notify a user of items that were matched at 503B. In some embodiments, the system may instruct a user device of the user to display an avatar of the user wearing the items matched at 503B. The system may also alert the user by instructing the user device to produce a sound, vibrate, and/or blink In some embodiments, a merchant device, such as a large displaying device and or monitor connected to the system and/or a merchant server may display the user avatar wearing items matched at 503B. The avatar may be retrieved from a user device on the user and/or from a server using an identifier from the user device. In some embodiments, the system may track the location of the user device of a user and display the avatar wearing recommended merchandise when the user is close to the monitor, such as within ten feet. The user's location may be tracked using GPS, triangulation from one or more beacons, and or the like.

At 505B the system may provide the user with the ability to purchase the item for pickup in the store. In some examples, an actuatable element may be displayed on the user device which allows the user to purchase an item. The user interface may provide the user to choose a method of payment and or enter in credit card information to complete the purchase. Once a purchase is completed, the system may notify the merchant and/or a merchant employee of the purchase. In some examples, the purchase may cause an item in the merchant store to be reserved for the user. The system may also direct the user to the item. In some embodiments, the user may be able instruct the system to mail the purchased merchandise to the user and/or hold the item for pickup at a later time.

In some embodiments, the merchant may employ beacons and trackers that may work in conjunction with the user device to direct the user to the reserved item. For example, the merchandise may have a locator tag emitting electromagnetic signals (e.g. Bluetooth wireless communications) that the user device may be able to detect. The system may activate the locator tag to emit a unique signal for the user device to detect. The system may then instruct the user device to home in on the locator tag based on the strength of the electromagnetic signal. In some examples, the merchant may have beacons that may triangulate the location of the user device in relation to the locator tag on the purchased merchandise and display a real time map on the user device indicating the location of the user in relation to the merchandise. In some examples, a locator tag may have an LED attached to it, and the LED may blink to alert the user of their purchased product.

Figure 6:
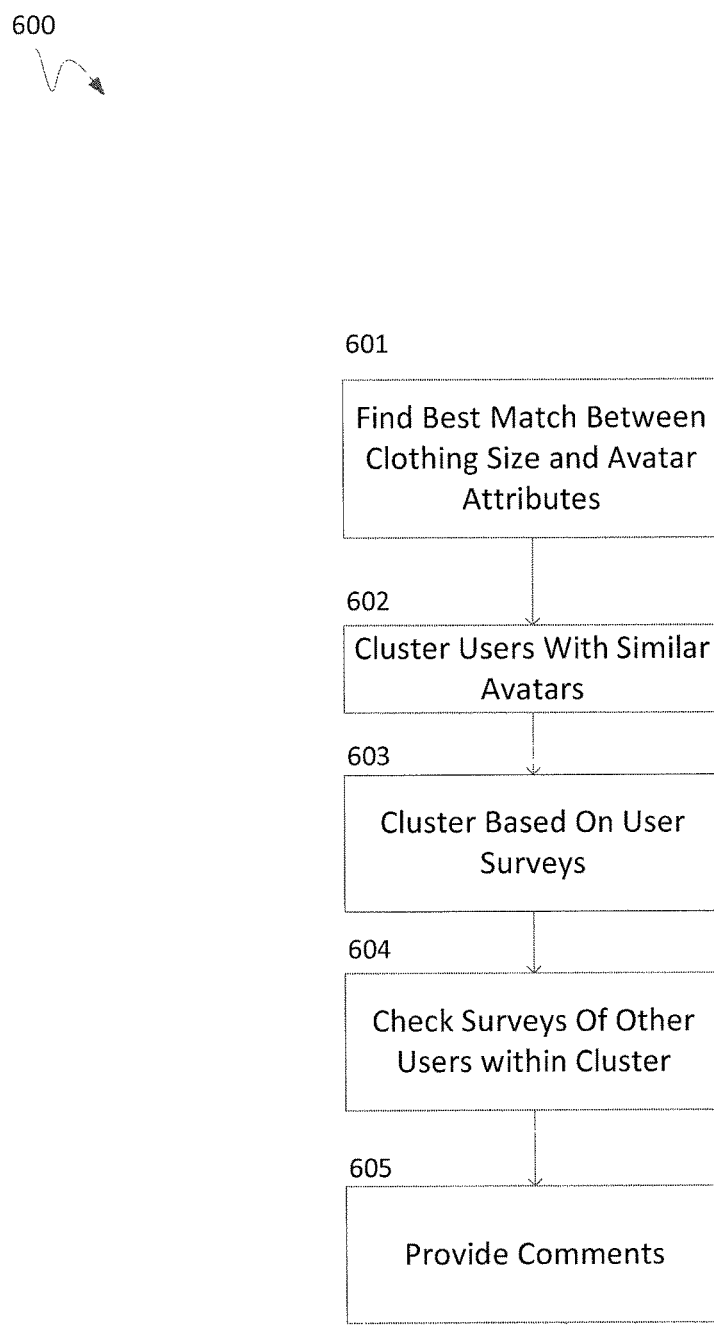
FIG. 6 is a flow diagram illustrating an exemplary process for aiding users in determining clothing fit.

FIG. 6 is a flow diagram illustrating a process 600 for aiding users in determining clothing fit. At 601, the system may take the best match for a user by comparing the attributes of the avatar for the user and the clothing attributes. In some examples, the system may choose the smallest clothing size where the avatar's attributes do not exceed the attributes of the clothing. For example, if there was a size small and medium pants with a belt measurement of 25 and 30 inches respectively, the system may choose the larger size when the user's waist size were greater than 25 inches but less than 30 inches.

At 602, the system may run a clustering algorithm on a database, such as avatar database 154 of FIG. 1, based on avatar attributes. For example, a clustering algorithm may be applied using height, weight, size, sleeve, waist, and/or other attributes as data points. In some embodiments, the attributes used for clustering may be based on the item of interest. For example, the system may not conduct a cluster based on shirt sizes when the item of interest is a pair of pants. In some examples, the system may isolate the data points that are relevant to the item, such as the lower body measurements for pants. The clustering algorithm may result in a first cluster for the user. Some exemplary clustering algorithms include but are not limited to hierarchical, point assignment, Gaussian, K-means, fuzzy C-means, and/or the like. In some embodiments, the system may cluster based on exact matches of one or more attributes.

At 603, the system may run another clustering algorithm on the first cluster, creating a sub-cluster. This clustering algorithm may be conducted on surveys that the user filled out on other purchases. For example, the user may have found a medium pants size from one brand too small and a medium pants size from another brand to be too big.

At 604, the system may check surveys within the sub-cluster determined at 603 on the clothing the user is interested in. The system may tally the survey responses that are found in the sub-cluster to find the most popular opinion.

At 605, the system may provide the most popular opinion. For example, the most popular opinion may be that the medium sized pants were a little tight, and the system may recommend the medium sized pants as the best fit, but that the user might find it to be a little tight. In this manner, the system will give advice to a user based on the experience of other users with similar body types and preferences on clothing fit.

Figure 7:
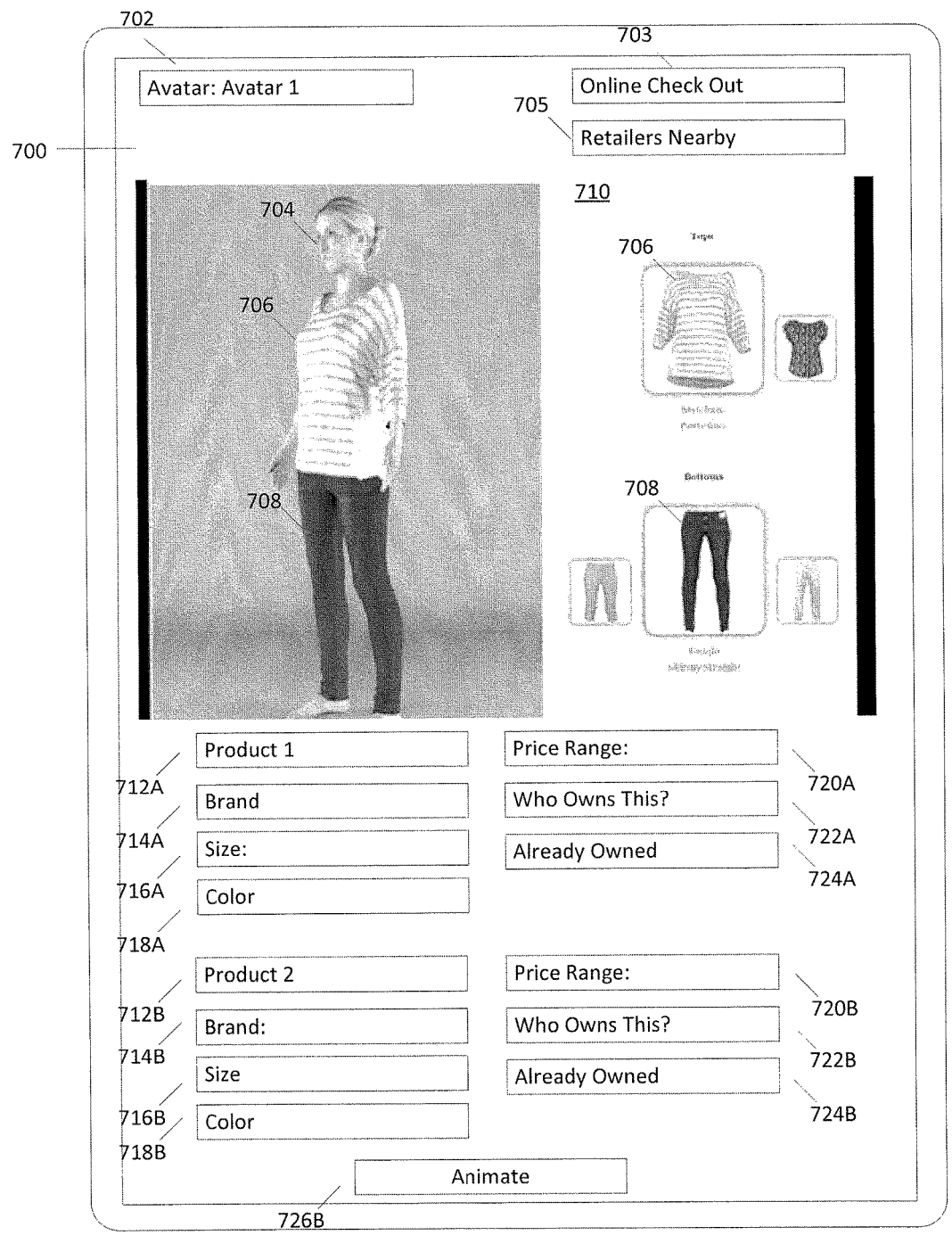
FIG. 7 is an exemplary graphical user interface for displaying an avatar.

FIG. 7 is an exemplary graphical user interface 700 for displaying an avatar on a user device. In some embodiments graphical user interface 7000 may be displayed on a user device such as one of the client devices 114 of FIG. 1. In some embodiments user graphical user interface 700 may be used for displaying an avatar according to one or more processes discussed with FIGS. 3-5 above.

In some embodiments, user interface 700 may have identifier 702 that identifies the avatar 704 being displayed. In some embodiments identifier 702 may double as a button and/or an actuatable element that, when actuated, provides a drop down list of different avatars that a user may be able to switch to. In some embodiments, the drop down list of avatars may be avatars of users who are within the social network of the user. In some embodiments, user interface 700 may have actuatable elements 603 and 605 which allow the user to purchase one or more objects from an online store and/or a retail store nearby.

In some embodiments, avatar 704 which is displayed in user interface 700 may be manipulated to be viewed from different angles. In some embodiments, a user may be able to zoom in/out, rotate, and/or flip the avatar. In some embodiments, certain body parts of avatar 704 may be actuatable elements and/or selectable for an isolated view, for example, the feet, hands, torso, legs, head, and/or the like. In some embodiments, the user may have the option to make the items worn by the avatar partially transparent, which allows the user to see how the clothing fits avatar 704.

Interface 700 may display clothing being worn by avatar 704, such as shirt 706 and pants 708. Interface 700 may have a selections section 710 which allows the user to change what is being worn by avatar 704. Selection section 710 may queue several clothing options for a user to scroll through and provided several styles for each clothing option.

Interface 700 may provide the names of the products being worn 712A and 712B, The brand 714A and 714B, size 716A and 716B, color options 718A and 718B, and the price range of the clothing from one or more merchants 720A and 720B.

In some embodiments, interface 700 may have actuatable elements 722A and 722B which allows the user to browse who owns a particular product. Some users may desire to be unique and want to ensure no one within the user's social network owns the product. In some embodiments, users may be able to check and see whether a celebrity owns a product. Some users may desire to copy a look of a favorite celebrity or have a style preference that aligns with a celebrity. The user may then browse what the celebrity has recently bought to stay up to date on current fashion trends.

In some embodiments, interface 700 may have indicators 724A and 724B which indicates whether the user already owns a product. In some embodiments, indicators 724A and 724B may also indicate whether someone had purchased the item as a gift for the user. In this manner the user may prevent purchasing duplicates of the item. In some embodiments, the indication whether someone owns an item or has been gifted an item may only appear after confirming checkout. The warning may interrupt a checkout and/or purchase of an item. In this manner, people will not be able to browse what items someone has purchased or owns and cannot game the system by faking purchases. For example, when purchasing a product, if the warning does not interrupt the checkout, the item purchase will fully complete and cause a funds exchange.

In some embodiments, interface 700 may have actuatable element 726, which may display an animation of the user wearing the clothing, to see how the clothing moves and looks when the avatar is in motion. In some examples, the animation may be the avatar doing a catwalk.

Figure 8:
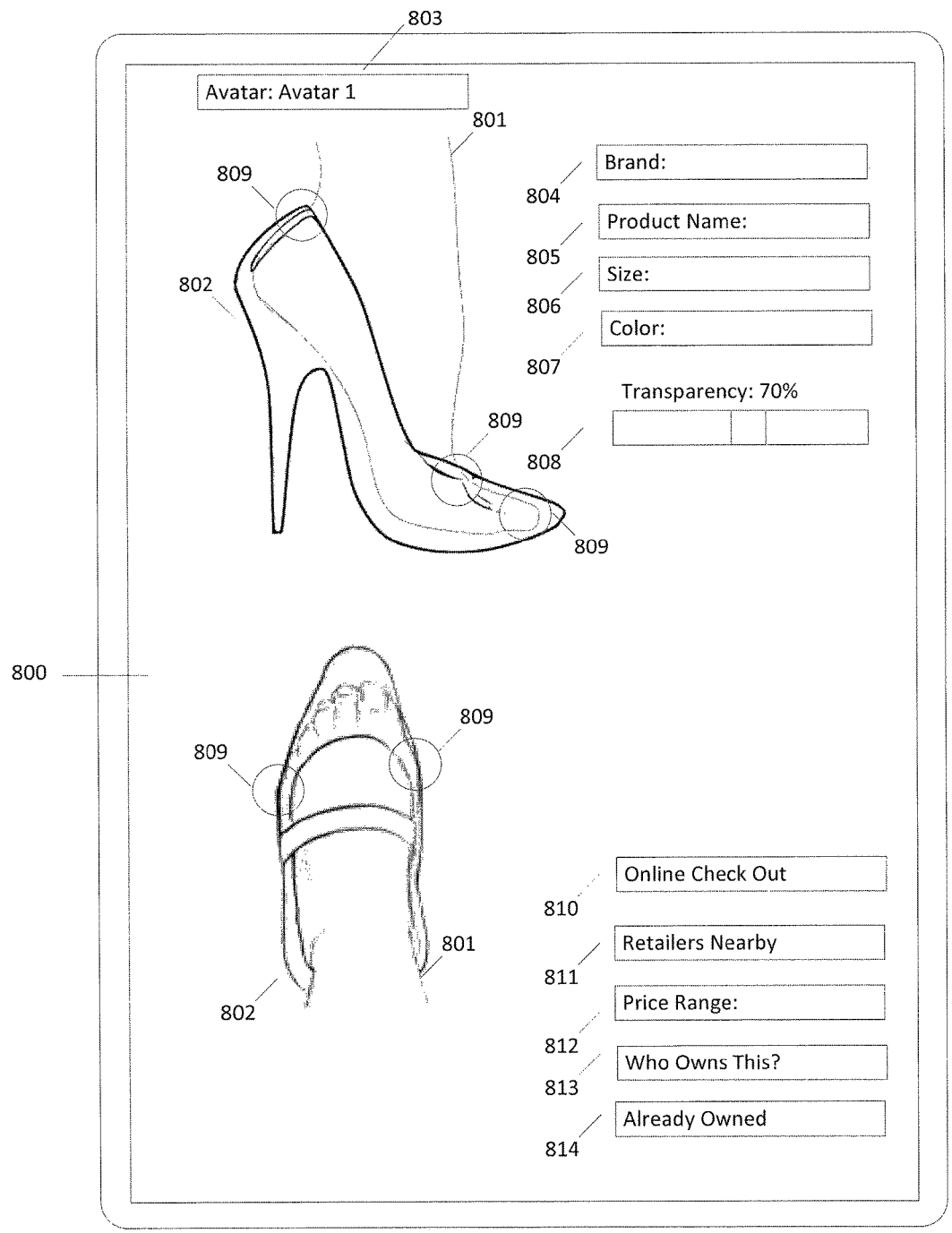
FIG. 8 illustrates an exemplary graphical user interface that may be displayed when a user focuses on a body part of an avatar, according to some embodiments.

FIG. 8 illustrates an exemplary graphical user interface 800 that may be displayed when a user focuses on a body part of an avatar, such as a foot, according to some embodiments.

Interface 800 may display the foot 801 of the avatar wearing a selected product such as shoe 802. The shoe and foot may be a scaled representation of a foot of a user and a shoe sold by a merchant. The scale used for the foot and shoe may be the same. This way, a user may be able to gauge how a shoe would fit on a person with the same attributes as the avatar.

Interface 800 may display an identifier 803 indicating which avatar the displayed foot belongs to. Interface 800 may also display the brand name 804, a product name for the show 805, the shoe size 806 being viewed, and a color option 807 for the shoe.

In some embodiments, the user may manipulate the display to rotate, flip, and otherwise manipulate the display of foot 801 from different viewing angles. In some embodiments, interface 800 may provide a control 808 for controlling the transparency of shoe 802, or other objects, worn by foot 801. In this manner a user may be able to view how crowded or loose an object fits. In some embodiments, interface 800 may provide indicators 809 that indicate where an object, such as shoe 802 may be tight and/or require stretching to fit the body part of the avatar, such as foot 801. Although interface 800 is displaying an avatar wearing a shoe, these principles can be applied to other products, including other clothing, sports equipment, furniture, etc.

In some embodiments, interface 800 may provide an actuatable element 810 for purchasing the displayed item online. Interface 800 may also provide information about retailers nearby that are selling the item 811, the price range of the item 812, an option to view who else owns the product 813, and whether the product has been purchased by and/or for a user linked to the product 814.

Figure 9:
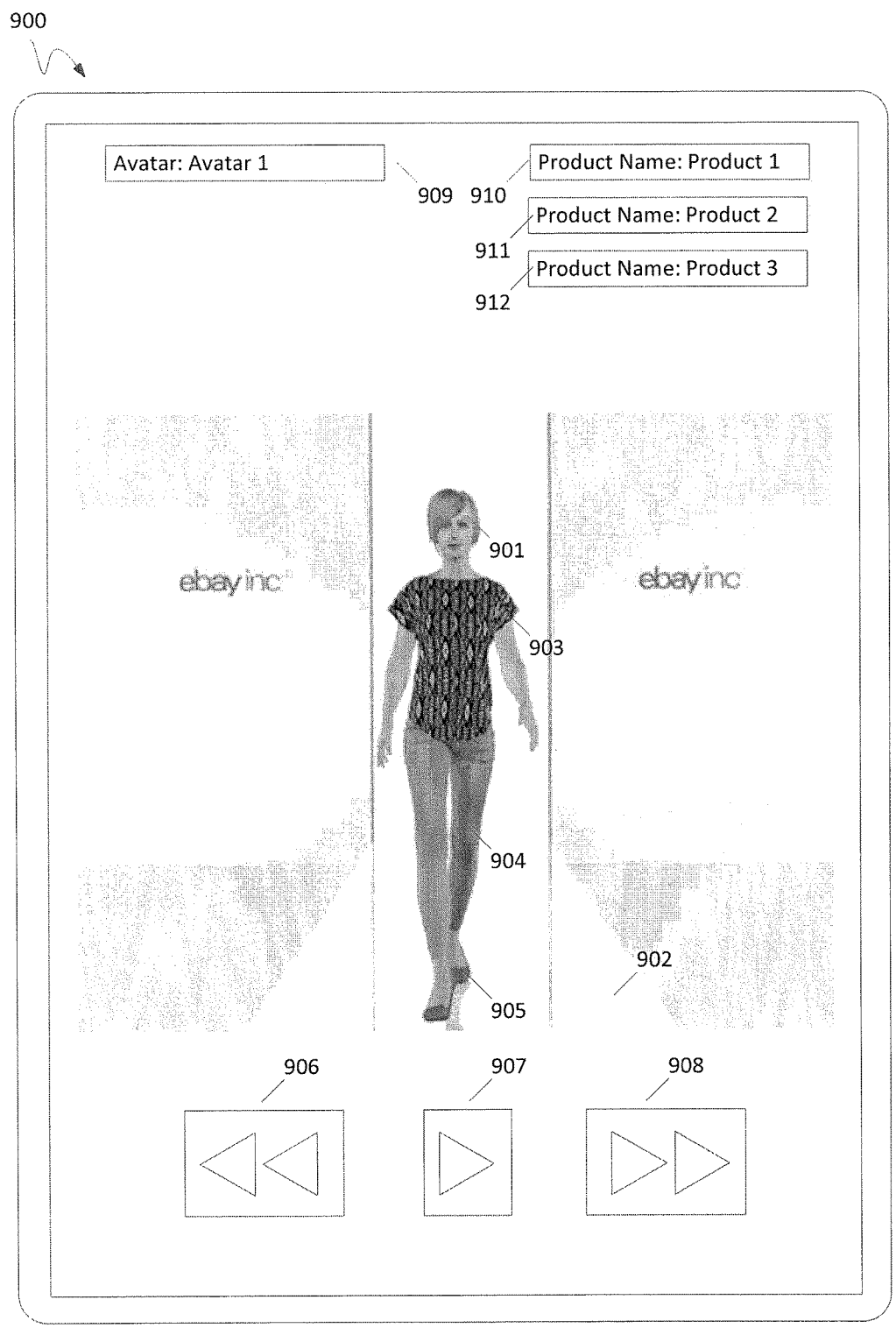
FIG. 9 is an exemplary user interface displaying a still of a catwalk animation that may be displayed on a user device, according to some embodiments.

FIG. 9 is an exemplary user interface displaying a still of a catwalk animation that may be displayed in a user interface on a user device 900 when actuatable element 626 of FIG. 6 is actuated. 3-D digital avatar 901 may be animated to walk the catwalk 902 using a predetermined animation. The avatar may be viewed wearing wearable items 903, 904, and 905 while doing the catwalk. The animation may render realistic movement of wearable items 903, 904, and 905 during the animation. In this manner, a user may be able to see how wearable items 903, 904, and 905 may look when worn by the person the avatar is based off of in real life.

In some embodiments, the animation may have controls for controlling the animation, such as rewind button 906, play and/or pause button 907, and fast forward button 908. In some embodiments there may be controls for changing the lighting to see how clothing may look under different lighting situations, such as in-doors, at night, outside during the day, and/or the like. In some embodiments, the animation may also display an indication 909 informing a user on which avatar is being displayed. Additionally, indications 910, 911, and 912 may be displayed informing the user of the different products that the avatar is exhibiting. In this manner, the animation may convey to a user how an item may look when worn without the user having to actually wear the clothing.

Figure 10:
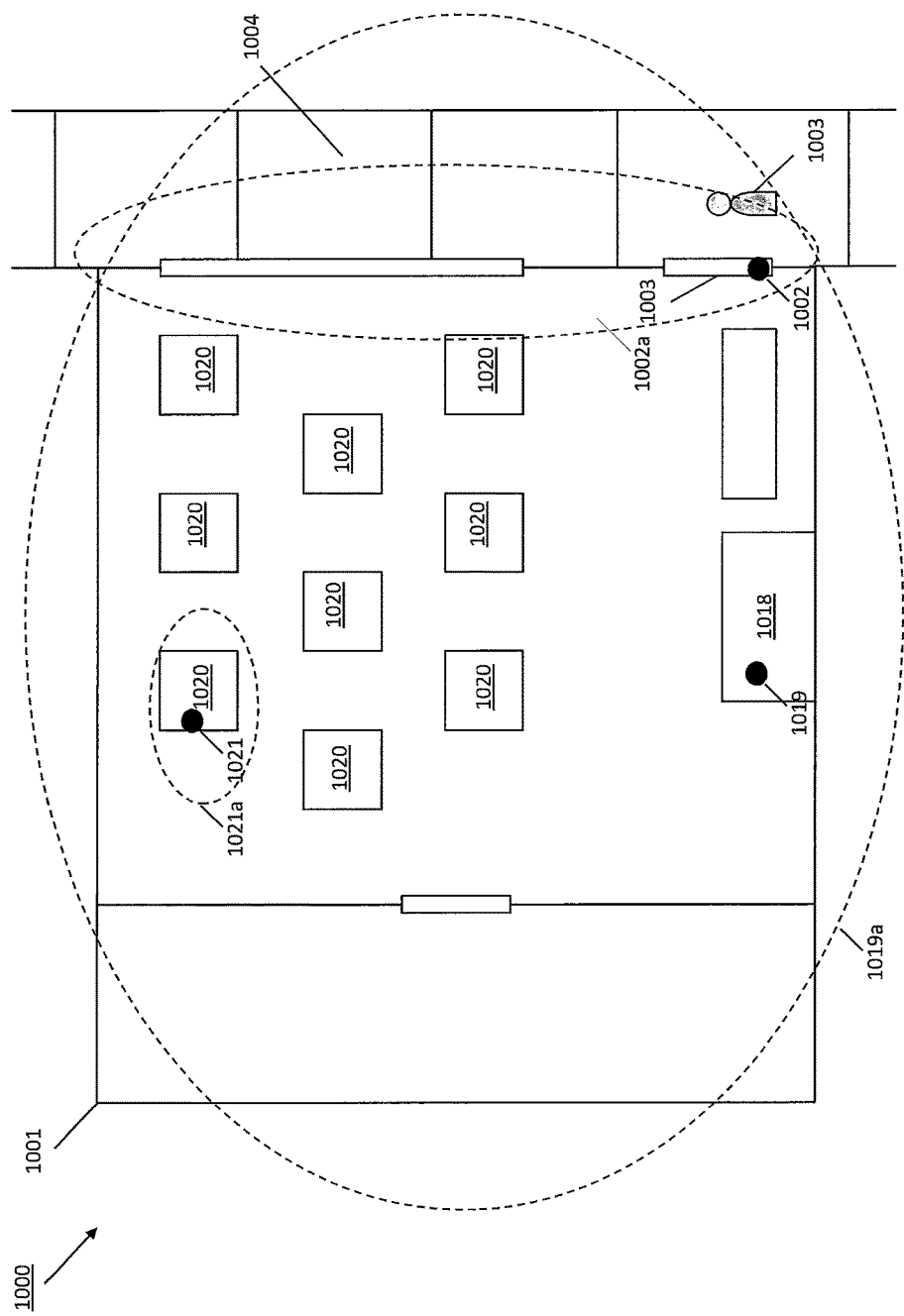
FIG. 10 illustrates an exemplary layout of a brick and mortar store implementing an exemplary system and method of displaying merchandise with avatars.

FIG. 10 illustrates an exemplary layout 1000 of a brick and mortar store 1001 that may be implementing one or more of the systems and methods described above. In some embodiments, brick and mortar store 1001 may employ a beacon 1002 at the front of the store for detecting user devices held by customers 1003 walking by on sidewalk 1004. Beacon 1002 may have a signal range 1002*a* which is directed outside of brick and mortar store 1001.

In some embodiments, beacon 1002 may be in wireless communications with server 1018 for sending and receiving information about the user and/or merchant inventory. Server 1018 may include a wireless communicator, such as a beacon 1019 that has a range 1019*a* that covers the store. Server 1018 may use beacon 1019 to locate user devices (not shown) and or merchandise 1020 within brick and mortar store 1001. In some embodiments, locating merchandise and user devices may be conducted through triangulation of the user device and or beacons on the merchandise. In some embodiments, triangulation may employ multiple beacons and/or wireless communicators within the store (not shown) that ping and/or detect signal strength from a beacon and/or user device. In some embodiments, merchandise 1020 may include a beacon 1021, such as a locator tag, with a short range signal of 1021*a*. Beacon 1021 may be used to detect whether a user device of a customer, such as customer 1003, is nearby and provide information about the clothing to the user device. In some embodiments, beacon 1021 may be in communication with server 1018 and relay clothing information to the user device of the customer. In some embodiments, beacon 1002, 1019, and 1021 may support multiple wireless communication systems and may cooperate with each other to cause one or more user devices on customers, such as customer 1003, to display an avatar wearing the merchandise.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on merchants and customers; however, a customer or consumer can pay, or otherwise interact with any type of recipient, including charities and individuals. The payment does not have to involve a purchase, but may be a loan, a charitable contribution, a gift, etc. Thus, merchant as used herein can also include charities, individuals, and any other entity or person receiving a payment from a customer. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
   a non-transitory memory; and
   one or more hardware processors coupled to the non-transitory memory and configured to read instructions from the non-transitory memory to cause the system to perform operations comprising:
     determining, by a beacon associated with a store, that a user device associated with a user is located within a range threshold of a location of the store;
     automatically retrieving, based on an identity of the user, user information representing physical characteristics of the user;
     determining an object for recommending to the user of the user device based at least in part on the physical characteristics of the user;
     generating, based on the physical characteristics of the user, an avatar that represents a digital image of the user;
     generating a digital representation of the object based on information related to the object retrieved from a computer server associated with the store;
     presenting an interactive user interface on a first display of the user device, wherein the interactive user interface comprises a first presentation of the avatar wearing the digital representation of the object;
     presenting, on a second display associated with the store, a second presentation of the avatar wearing the digital representation of the object; and
     in response to receiving a first user input with the interactive user interface presented on the user device, causing the second presentation of the avatar to display a first movement of the avatar wearing the digital representation of the object.

2. The system of claim 1, wherein the determining that the user device is located within the range threshold comprises receiving communications, from the beacon, indicating a proximity of the user device to the beacon.

3. The system of claim 1, wherein the user is a first user, wherein the physical characteristics of the first user are first physical characteristics, and wherein the determining the object comprises:
   determining a group of users having physical characteristics within a predetermined threshold of the first physical characteristics of the first user; and determining the object based on object preferences of the group of users.

4. The system of claim 1, wherein the operations further comprise:
receiving, via the interactive user interface, a second user interaction indicating a modification to an option of the object; and
modifying the digital representation of the object in response to the second user interface.

5. The system of claim 1, wherein the operations further comprise:
presenting, on the interactive user interface, purchase options for purchasing the object; and
receiving, from the user device, a purchase request indicating one of the purchase options.

6. The system of claim 1, wherein the object is a wearable object.

7. The system of claim 1, wherein the beacon is situated at a sidewalk outside the store.

8. The system of claim 1, wherein the operations further comprise:
tracking, via the interactive user interface, user interactions of the user with the avatar;
determining a second object for recommending to the user based on the tracked user interactions with the avatar and the inventory of the store; and
presenting a digital representation of the second object on the user device.

9. The system of claim 1, wherein the first movement comprises at least one of a rotation or a movement along a catwalk.

10. The system of claim 1, wherein the operations further comprise causing the digital representation of the object to move according to a first characteristic of the object.

11. The system of claim 1, wherein the digital representation of the object is partially transparent when the digital representation of the object is worn by the avatar.

12. A computer implemented method comprising:
determining, by one or more hardware processors using a beacon associated with a store, that a user device associated with a user is located within a range threshold of a location of the store;
automatically retrieving, by the one or more hardware processors based on an identity of the user, user information representing physical characteristics of the user;
determining, by the one or more hardware processors, an object for recommending to the user of the user device based at least in part on the physical characteristics of the user;
generating, by the one or more hardware processors, based on the physical characteristics of the user, an avatar that represents a digital image of the user;
generating, by the one or more hardware processors, a digital representation of the object based on information related to the object retrieved from a computer server associated with the store;
presenting, by the one or more hardware processors, an interactive user interface on a first display of the user device, wherein the interactive user interface comprises a first presentation of the avatar wearing the digital representation of the object;
presenting, by the one or more hardware processors on a second display associated with the store, a second presentation of the avatar wearing the digital representation of the object; and
in response to receiving a first user input with the interactive user interface presented on the user device, causing, by the one or more hardware processors, the second presentation of the avatar to display a first movement of the avatar wearing the digital representation of the object.

13. The method of claim 12, wherein the determining that the user device is located within the range threshold comprises receiving communications, from the beacon, indicating a proximity of the user device to the beacon.

14. The method of claim 12, wherein the user is a first user, wherein the physical characteristics of the first user are first physical characteristics, and wherein the determining the object comprises;
determining a group of users having physical characteristics within a predetermined threshold of the first physical characteristics of the first user; and
determining the object based on object preferences of the group of users.

15. The method of claim 12, wherein the determining the object comprises:
accessing a browsing history of the user device; and
determining that the browsing history does not indicate access, at an online store associated with the store, for the object.

16. The computer implemented method of claim 12, further comprising:
tracking, via the interactive user interface, user interactions of the user with the avatar;
determining a second object for recommending to the user based on the tracked user interactions with the avatar and the inventory of the store; and
presenting a digital representation of the second object on the user device.

17. The computer implemented method of claim 12, wherein the first movement comprises movement along a catwalk.

18. A non-transitory machine-readable medium having stored thereon machine-readable instructions executable to cause a machine to perform operations comprising:
determining, based on an indication from a beacon associated with a store, that a user device of a user is located within a range threshold of a location of the store;
automatically retrieving, based on an identity of the user, user information representing physical characteristics of the user;
determining an object for recommending to the user based at least in part on the physical characteristics of the user;
generating, based on the physical characteristics of the user, an avatar that represents a digital image of the user;
generating a digital representation of the object based on information related to the object retrieved from a computer server associated with the store;
presenting an interactive user interface on a first display of the user device, wherein the interactive user interface comprises a first presentation of the avatar wearing the digital representation of the object;
presenting, on a second display associated with the store, a second presentation of the avatar wearing the digital representation of the object; and
in response to receiving a first user input with the interactive user interface presented on the user device, causing the second presentation of the avatar to display a first movement of the avatar wearing the digital representation of the object.

19. The non-transitory machine-readable medium of claim 18, wherein the user is a first user, wherein the physical characteristics of the first user are first physical characteristics, and wherein the determining the object comprises:
- determining a group of users having physical characteristics within a predetermined threshold of the first physical characteristics of the user; and
- determining the object based on object preferences of the group of users.

20. The non-transitory machine-readable medium of claim 18, wherein the operations further comprise:
- receiving a pause data collection setting from the user device;
- receiving an indication that the object was purchased by the user; and
- preventing recording of the indication that the object was purchased by the user based on the pause data collection setting.

* * * * *